March 28, 1967 R. J. ECKHOLM 3,311,017
PROJECTION-SCREEN SYSTEM
Filed March 3, 1964
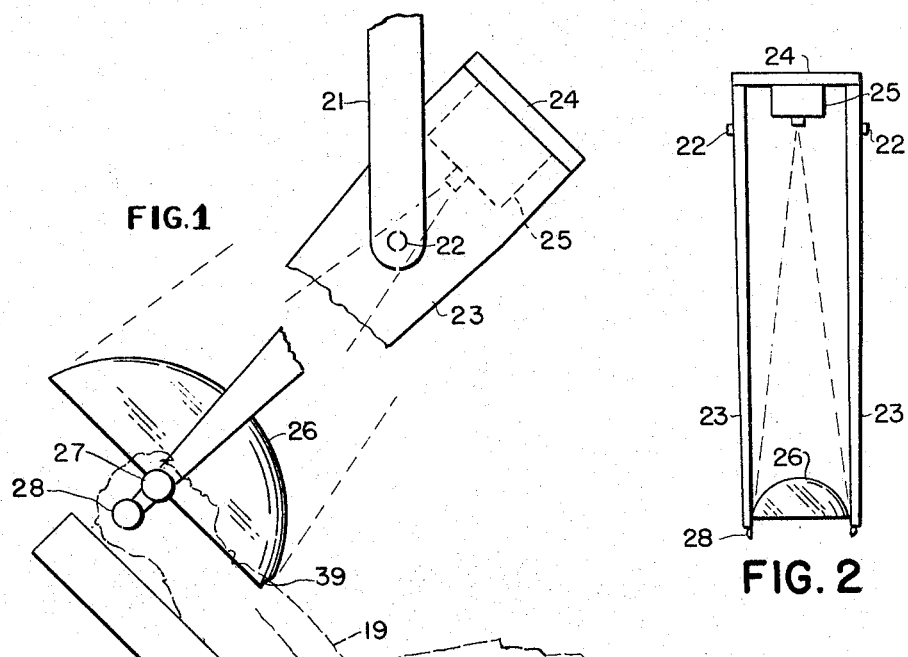
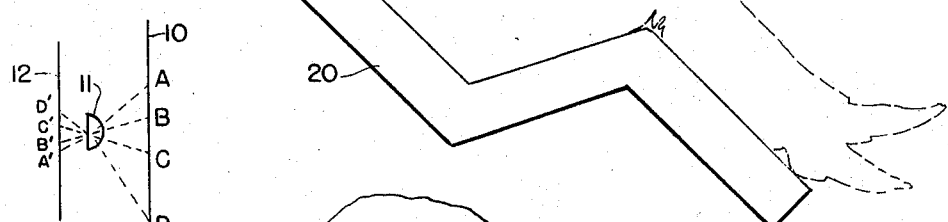
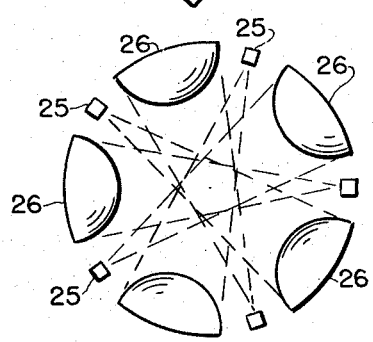
INVENTOR:
ROBERT J. ECKHOLM
BY Peter L. Tailer
ATTORNEY

United States Patent Office 3,311,017
Patented Mar. 28, 1967

3,311,017
PROJECTION-SCREEN SYSTEM
Robert J. Eckholm, 505 Grand St.,
New York, N.Y. 10002
Filed Mar. 3, 1964, Ser. No. 349,115
7 Claims. (Cl. 88—24)

This invention relates in general to apparatus for projecting and displaying still and motion pictures and, more particularly, to a specific process and apparatus which provides a viewer with visual sensations which are substantially identical to those received in life. I call the apparatus and process of this invention by the trade name "Panisphere."

An object of this invention is to provide a display apparatus which gives a viewer the sensation of actually being present or in a viewed scene.

Another object of this invention is to provide an entirely new entertainment and dramatic medium.

A further object of this invention is to provide a mass entertainment device for which a theater may be housed in a conventionally constructed multi-story building.

Yet another object of this invention is to produce a visual image surrounding the head of a viewer so that the image fills most, if not all, of the field of view possible to human vision.

A still further object of this invention is to provide a curved rear projection screen and a projection system therefor so that images projected on the curved screen appear undistorted to a viewer substantially in the center of the curvature of the screen.

A feature of this invention is the rear projection of an image on the rear surface of a concave rear projection screen with the eyes of a viewer being placed substantially within and in the center of the screen, the image being rear projected on the screen having its edges radially compressed to compensate for distortion which would otherwise be occasioned by the curvature of the edges of the concave screen.

Many other objects, advantages and features of invention reside in the particular construction, combination and arrangement of parts involved in the embodiment of my invention and its practice otherwise as will be understood from the following description and accompanying drawing wherein:

FIGURE 1 is a side view of a reclining seat before which there is positioned a projector and screen according to my invention with central portions of screen support arms broken away and with the figure of a reclining viewer shown in broken lines;

FIGURE 2 is a plan view of a screen held in front of a projector by screen support arms;

FIGURE 3 is a schematic drawing showing the cause of the edge compression effect when a scene is photographed on film using a wide angle lens;

FIGURE 4 is a front view of a fragment on which there is drawn a figure to be photographed;

FIGURE 5 is a fragment of a motion picture film showing a single frame on which there is printed the figure shown in FIGURE 4 photographed through a wide angle lens;

FIGURE 6 is a schematic drawing of a projector projecting an image from a fragment of film onto the rear surface of a screen shown in vertical section;

FIGURE 7 is a rear view of the screen of FIGURE 6 showing two picture images projected thereon; and FIGURE 8 is a top view of five screens and five projectors disposed in a circular arrangement.

Referring to the drawing in detail, pictures to be shown on the apparatus of my invention are first photographed through a wide angle lens. In one experiment, the 180 degree Nikkor $f{:}8$, 8 mm., fish eye lens made by Nippon Kogaku K.K. of Shinagawa, Tokyo, Japan, was used. As shown in FIGURE 3, line 10 represents a surface being photographed through a wide angle lens 11 onto the film surface 12. The points A, B, C and D on surface 10 are recorded on the surface of film 12 at points A′, B′, C′ and D′. Points A, B and C are equidistant from each other in the same vertical plane. However, point A′ lies considerably closer to point B′ than does point C′ from point B′. Even point D, which is disposed at a relatively wide angle from lens 11, is projected by lens 11 to a point D′ which is relatively close to point C′ on film surface 12.

Therefore, as shown in FIGURES 4 and 5, if the design of figure 13 on the fragment 14 was photographed from close up with a wide angle lens 11, the image would appear substantially as shown in FIGURE 5. FIGURE 5 shows a strip of motion picture film 15 having a number of frames 16. Only a circular portion 17 of each frame is exposed because a wide angle lens 11 throws light within a circle and gives rise to an "edge compression" effect in which the more peripheral portion of an image is more radially compressed on the film. Thus the figure 13 shown in FIGURE 4 is distorted to appear substantially similar to the figure 18 shown in FIGURE 5 when it is photographed through a wide angle lens.

In the practice of this invention, a wide angle lens is used to take a motion picture for entrainment or for any other purpose. As shown in FIGURE 1, a viewer 19 reclines on a seat 20 or the like. Two side members 21 of a yoke extend downward from the ceiling. By means of the trunnions 22, the screen support arms 23 are rotatably supported by the arms 21. A cross member and counterweight 24 connects the rearwardly disposed ends of the screen support arms 23. A motion picture projector 25 is mounted on cross member 24.

Disposed in front of projector 25 between the front ends of the screen support arms is a substantially hemispherical transparent screen 26. Screen 26, in one test device which was demonstrated, consisted of a plastic hemisphere which had its outer surface sandblasted to receive a rear projected image. Since the techniques of rear projection are well known on flat screens, anyone skilled in the art may apply these techniques to the hemispherical screen of this invention. Screen 26 is held between the screen support arms 23 by the fastening members 27. Stereophonic sound may be suppled by two small speakers 28 placed on each side of the head of a viewer.

As shown in FIGURE 6, a projector has a light source 30 which projects the image on the circular portion 17 of a film 15 through a conventional lens system 31 onto the back surface of a screen 26. To make sure that the entire image projected on screen 26 is in focus, the lens system 31 should have a depth of focus at least equal to the depth of the screen 26. A special lens system could be designed and used in the practice of this invention. Such a lens system would project and focus images in the plane of a curved surface such as a screen 26.

The numeral 32 represents the eye of a viewer. If it is desired to have the viewer at 32 see the motion picture of an airplane looping about him while remaining equidistant from him as if he was suspended in the basket of a balloon as the airplane flew upward in front of him, the angle subtended between the nose and tail of the image of the airplane would remain constant to the eye of the viewer. The "edge compression" phenomenon produces this desired result because the smaller angle subtended by the projected image toward the periphery of screen 26 is offset by the fact that the light strikes the screen at an angle to the surface of the screen and thus extends it over a greater area. Thus, as shown in FIGURE 6, the projection angle subtended by points X and Y on the screen is greater than the projection angle subtended by the points X′ and Y′ on the periphery of the screen. However, from the position 32 of the eye of a viewer, the angles subtended between the points X and Y and the points X′ and Y′ are equal.

In addition to the radial edge compression which arises when photographing through a wide angle lens, some peripheral circumferential edge compression may take place. Since the edge of the screen 26 is further from the projector 25 than is the center part of the screen 26, circumferential edge compression may be corrected to some extent as light rays from projector 25 diverge further apart at greater distances from the projector.

Thus, as shown in FIGURE 7, if the eye of a viewer was placed substantially in the center of screen 26, the two airplane images 34 and 35 would appear identical.

The effects produced on a viewer by this invention must be experienced to be appreciated. For best results, the screen 26 should be at least 20 inches in diameter and, preferably, over 30 inches in diameter. When a motion picture is taken with a suitable wide angle lens and projected on screen 26 in the manner which has been described, a viewer sees a scene before him which substantially corresponds to reality. Although the actual image may only be some 10 or 12 inches from the eyes of a viewer in an extreme case, his eyes will turn inward, as in reading, to focus on a given spot. The entire area of peripheral vision, which is completely ignored in all other viewing devices, may be utilized in this invention. Therefore, even if conventional 3–D techniques are not used with this invention, a great sense of depth is obtained. For example, if a film is taken from the front of an automobile driving along a road, the scene directly in front of a viewer on the screen 26 of this invention will be more or less conventional in its effect. However, images of objects will be projected on the sides of screen 26 representing objects flashing past at great speed in the area of peripheral vision. This gives a feeling of depth which cannot be obtained in any other viewing process.

Further, in a dramatic scene, the actual angle subtended during the closeup of an actor is exactly that which would be seen by a viewer if he were looking at the actor at arm's length. Also, when one actor speaks to another, the viewer may look from one to the other exactly as if he was present in a room in which a conversation was taking place.

Many standard techniques may be applied to the apparatus of this invention such as well known 3–D processes, color projections, opaque projections, television pictures, and still as well as motion picture projections. Stereo sound and ventilating devices supplying air to a viewer may also be used. As shown in FIGURE 1, the concave screen 26 has a cut out portion 39 to fit over the chest of a viewer.

While substantially hemispherical screens 26 are shown, screens having different curvatures may also be used. For example, a screen having a different curvature about a vertical and a horizontal axis may be used. In such a case, the projector must project an image having an edge compression effect corresponding to the curvature of the screen. Thus a cylindrical screen may even be used. In some cases the screen may extend to subtend an angle of more than 180 degrees about the head of a viewer. To properly achieve the desired effect produced by this invention, a cone of view of at least 90 degrees should be presented to the viewer.

If feature length films for entertainment are made to be used in the device of this invention, theaters having large seating capacities may be provided. As shown in FIGURE 8, a number of screens 25 and projectors 26 may be arranged in a circle as projected light beams may cross in the center of a circle without interference. Such circular or other arrangements of projectors and screens could be set up under relatively low ceilings. Thus a thousand seat or more theater may be contained in a standard factory or office type multi-story building with one hundred or more seats disposed on each floor. Thus special theater structures are not required to be built to house a theater using the apparatus of my invention. In a large theater with many Panisphere units being used, a single film strip could pass through a number of projectors or one projection could be diverted to be rear projected on a large number of curved screens.

Further, while I have shown and described the projection of films taken with a wide angle lens, any other projection techniques projecting an image having an "edge compression" effect may be used. My invention may also be practiced in connection with toys, training aids, amusement devices, and the like.

While I have shown and described my invention in the best form known to me, it will nevertheless be understood that this is purely exemplary and that modifications may be made in the construction, arrangement and combination of parts involved in the invention and equivalents may be substituted without departing from the spirit and scope of the invention except as it may be more limited in the appended claims wherein I claim:

1. The process of presenting a visual image comprising the steps of rear projecting an image having increasingly radially compressed portions toward its edges onto a concave screen disposed in front of a viewer with the screen and the rear projected image extending at least substantially within a 90° cone of vision of the viewer, viewing the screen from substantially the center of curvature of the screen, and projecting the more compressed edge portions of the image on the more rearwardly sloping edges of the screen.

2. The process of presenting a visual image comprising the steps of photographing a scene through a wide angle lens producing an image having radially compressed edges, rear projecting the image on a curved screen disposed in front of a viewer with the screen and the rear projected image extending at least substantially within a 90° cone of vision of the viewer, viewing the screen from substantially the center of curvature of the screen, and projecting the compressed edges on the curved and rearwardly sloping edges of the screen.

3. The process of presenting a visual image comprising the steps of photographing a scene through a 180 degree wide angle lens producing an image on film having radially compressed edges, rear projecting the image on a substantially hemispherical screen disposed in front of a viewer, viewing the screen from substantially the center of the screen, and projecting the compressed edges of the image on the curved and rearwardly sloping edges of the screen.

4. An apparatus for viewing a projection on a screen comprising a curved screen having a convex and a concave side, the concave side being disposed adjacent to a viewer, and means rear projecting an image having compressed edges on the convex side of said screen, the compressed edges being projected on the rearwardly sloping edges of the curved screen, the curved screen being viewed substantially from its center of curvature and extending at least substantially within a 90° cone of vision of a viewer.

5. An apparatus for viewing a projection on a screen comprising a concave screen having convex and concave sides and having rearwardly sloping edges, said screen being adapted for rear projection, and means rear projecting an image having compressed edges on the convex side of said screen, the compressed edges of the image being projected on the rearwardly sloping edges of the concave screen, the concave screen being viewed substantially from the center of its concave side, and extending at least substantially within a 90° cone of vision of a viewer.

6. The combination according to claim 5 wherein said screen is substantially hemispherical.

7. An apparatus for viewing a projection on a screen comprising a concave rear projection screen having curved and rearwardly sloping edges, said screen being substantially hemispherical with a convex and a concave side, a transparent film having an image thereon with radially compressed edges, a light source behind said film, and a conventional lens system rear projecting the image on said film onto the convex side of said screen, the screen being viewed substantially from the center of its concave side and the compressed edges of the image being projected on the rearwardly sloping edges of said screen.

References Cited by the Examiner

UNITED STATES PATENTS

| | | | |
|---|---|---|---|
| 2,299,682 | 10/1942 | Conant. | |
| 2,792,746 | 5/1957 | O'Brien | 88—24 |
| 2,938,279 | 5/1960 | Hemstreet | 88—24 |
| 2,999,322 | 9/1961 | Hemstreet. | |
| 3,003,257 | 10/1961 | Madden | 88—24 |
| 3,203,328 | 8/1961 | Brueggemann | 88—24 |
| 3,229,576 | 1/1966 | Rees | 88—24 |

NORTON ANSHER, *Primary Examiner.*

H. H. FLANDERS, R. A. WINTERCORN,
*Assistant Examiners.*